United States Patent
Kurtz

(10) Patent No.: US 6,564,644 B1
(45) Date of Patent: May 20, 2003

(54) HIGH TEMPERATURE SURFACE MOUNT TRANSDUCER

(75) Inventor: Anthony D. Kurtz, Ridgewood, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 0 days.

(21) Appl. No.: 10/029,683

(22) Filed: Dec. 21, 2001

(51) Int. Cl.[7] .............................. G01L 9/00; G01L 9/16
(52) U.S. Cl. ........................................................ 73/754
(58) Field of Search .................. 73/706, 708, 715–727, 73/753, 754, 756; 438/51, 53, 55, 64, 118, 455, 456, 15; 361/283.1, 283.2, 283.3, 283.4; 338/2, 4, 42

(56) References Cited

U.S. PATENT DOCUMENTS

| | | | |
|---|---|---|---|
| 5,973,590 A | 10/1999 | Kurtz et al. ................... | 338/42 |
| 6,210,989 B1 | 4/2001 | Kurtz et al. ................... | 438/51 |
| 6,272,929 B1 | 8/2001 | Kurtz et al. ................... | 73/727 |
| 6,293,154 B1 | 9/2001 | Kurtz ........................... | 73/727 |

*Primary Examiner*—William Oen
(74) *Attorney, Agent, or Firm*—Duane Morris LLP

(57) ABSTRACT

There is disclosed a high temperature surface mounted pressure transducer. The pressure transducer consists of three basic parts which include an ultra thin surface mount sensor positioned on a borosilicate glass structure having four or more circular depressions which correspond to the contact areas of the semiconductor sensor with additional depressed lead-out channels. The lead-out channels and the contact depressions are metalized with a high temperature metalization system. The composite structure consisting of the ultra thin surface mount sensor and borosilicate glass support structure is now mounted in a metallic flat-pack header or housing. In so mounting, the sensor is first mounted to the glass structure using a metal glass frit in the contact depressions and as Pyroceram glass in the non-protruding area of the sensor structure. The composite sensor metalized glass structure is then affixed to the metal structure, which is the metallic housing using an ultra high temperature solder such as indium gold or a low melting Pyroceram. The lead on the glass support plates are soldered to the leads on the flat-pack and the flat-pack can now be attached to any structure either by spot welding or by a suitable solder or other cement.

20 Claims, 12 Drawing Sheets

Pattern Glass

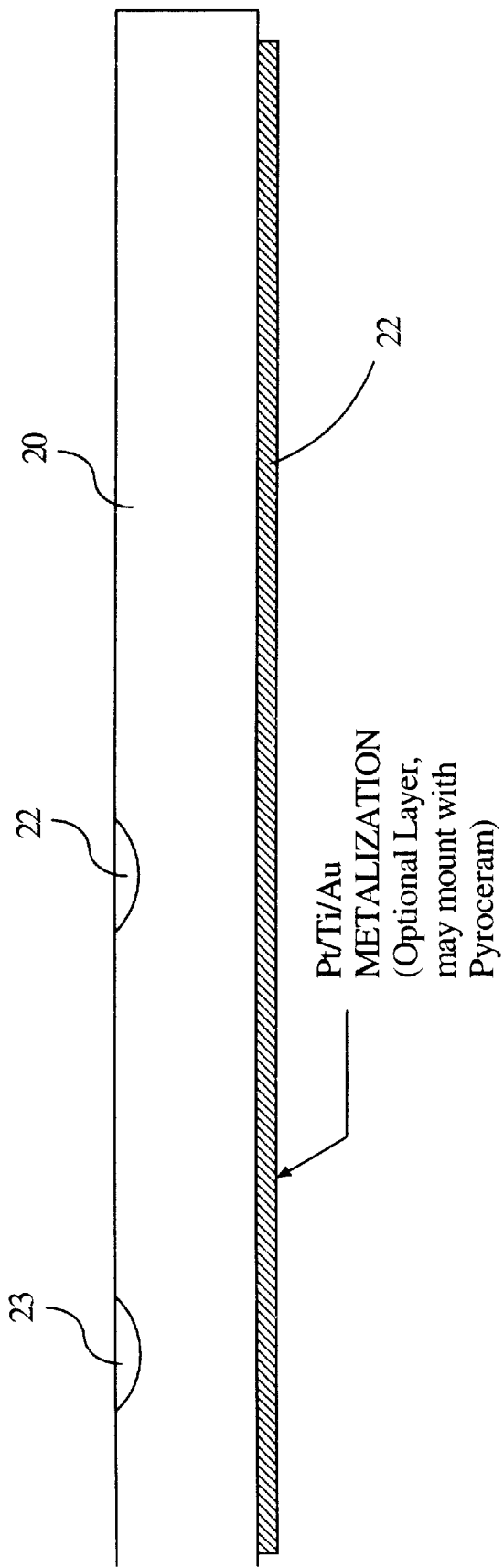

Leadless Chip Mounted on Glass

HIGH TEMPERATURE SURFACE MOUNT TRANSDUCER

FIELD OF INVENTION

The present invention relates to semiconductor transducers and more particularly to an apparatus and method for producing a high temperature, surface mounted pressure transducer, an ultra thin surface mounted pressure transducer suitable for use in a high temperature high, acceleration environment.

BACKGROUND OF THE INVENTION

Semiconductor pressure transducers are employed in the measurement of pressure in numerous types of applications and environments. Many pressure transducers employ a relatively thin diaphragm fabricated from semiconductor materials such as silicon. Upon the diaphragm is deposited or otherwise formed a piezoresistive strain gage configuration, such as a bridge circuit, where the resistors associated with the bridge exhibit a change in resistance according to the deflection of the diaphragm. By monitoring the change in resistance, one obtains an output voltage indicative of the applied pressure or force. The operation of such transducers is very well known. Pressure transducers capable of operating at high temperatures as, for example, at 900° F., and having small physical dimensions, particularly thickness, which are highly desired in various applications. For instance, the measurement of air or other fluid flow across turbine blades in a jet engine can occur in a high temperature, high acceleration environment. Moreover, the mounting of such a transducer on the turbine blade or similar structure should perturb the fluid flow as little as possible thus implying a very thin transducer.

Reference is made to U.S. Pat. No. 5,973,590 issued on Oct. 26, 1999 entitled, "Ultra Thin Surface Mount Wafer Sensor Structures and Methods of Fabricating the Same" to A. D. Kurtz et al. and is assigned to Kulite Semiconductor Products, Inc., the assignee herein, as well as U.S. Pat. No. 6,210,989 entitled, "Ultra Thin Surface Mount Wafer Sensor Structure and Methods for Fabricating the Same" which issued on Apr. 3, 2001 to A. D. Kurtz et al. As will be explained, the sensor depicted in those patents is used in the present invention together with additional components to provide a high temperature surface mounted transducer. In addition, an acceleration compensated sensor if desired, can be used which is fabricated using the methods taught in U.S. Pat. No. 6,293,154 entitled, "Vibration Compensated Pressure Sensing Assembly" which issued on Sep. 25, 2001 to A. D. Kurtz et al and is assigned to the assignee herein. The surface mounting of a transducer is extremely desirable, as it can be accommodated by a flat-pack configuration, making it adaptable for use in many different environments. Such uses are in the automotive, aeronautical, and other industries to provide a high temperature transducer in a flat-pack configuration which is compact and easy to install. Such uses include the monitoring of turbine blade airflow or airflow over rocket surfaces and so on.

SUMMARY OF INVENTION

A high temperature transducer structure comprises an insulator planar member having disposed on a top surface a plurality of depressions for accommodating contact areas, each depression has an associated metalized channel directed from the depression to a contact end of the planar member. A silicon sensor member has a deflectable diaphragm area associated with piezoresistive sensors. The active area is surrounded by a non-active area, the non-active area has a plurality of contacts coupled to the piezoresistive sensors and is directed through contact apertures to a contact surface of the silicon member. The plurality of contacts are arranged in congruency with the plurality of depressions so that each contact of the sensor member is positioned in an associated depression when the sensor member is positioned on the planar member. There are means for securing the sensor member to the planar member to form a composite member and a metallic flat housing has external leads at a terminating end. The housing accommodates the composite member which has an associated external lead which corresponds with an associated metalized channel for connecting the lead to the channel when the corporate member is located in the housing.

BRIEF DESCRIPTION OF THE FIGURES

FIG. 4 is a side view of the glass support structure shown in FIG. 3A and 3B.

DETAILED DESCRIPTION OF THE FIGURES

Figure 1:
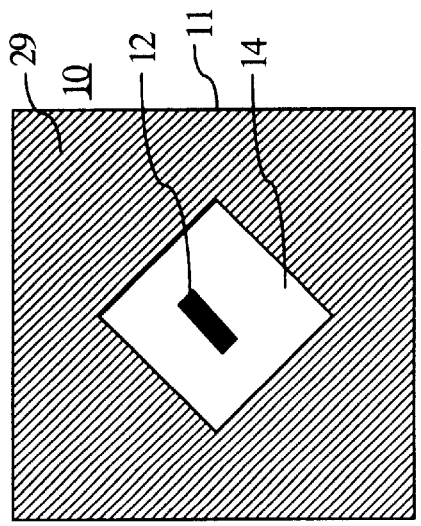
FIG. 1 is a top plan view of a sensor used in this invention.
Figure 2:
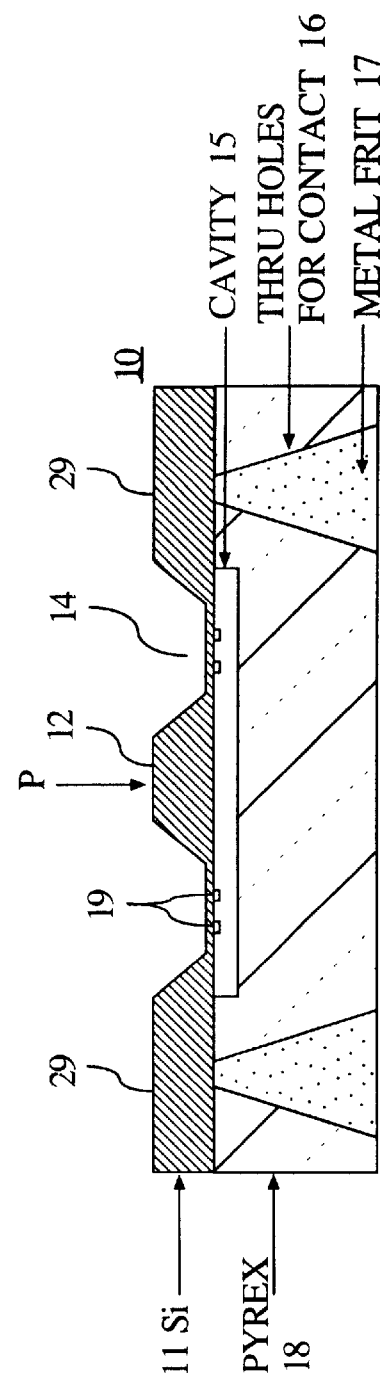
FIG. 2 is a cross sectional view of the sensor of FIG. 1.

Referring to FIG. 1 and FIG. 2, there is shown a top and a cross sectional view of an ultra thin surface mount sensor structure. The structures shown in FIG. 1 and FIG. 2 is the structure of the sensor configuration as shown, for example, in U.S. Pat. No. 5,973,590 entitled, "Ultra Thin Surface Mount Wafer Sensor Structure and Method for Fabricating the Same" issued on Oct. 26, 1999 to A. D. Kurtz et al. and is assigned to the assignee herein. See also U.S. Pat. 6,272, 929 issued on Aug. 14, 2001 entitled, "High Pressure Piezoresistive Transducer Suitable for use in Hostile Environments" to A. D. Kurtz et al. and is assigned to the assignee herein. For similar configurations see also U.S. Pat. No. 6,210,989 entitled, "Ultra Thin Surface Mount Wafer Sensor Structures and Methods for Fabricating the Same" issued on Apr. 3, 2001 to A. D. Kurtz et al. and is assigned to the assignee herein. These patents show sensor structures which basically, and as will be explained, are to be employed in the present invention.

Referring to FIG. 1, there is shown a top view of the wafer 11. Basically, wafer 11 is fabricated from the silicon and has a central boss 12 surrounded by a rectangular or thin depression defined as a frame 14. The area 14 is the active area of the sensor and deflects upon applications of a force to the sensor surface. Residing in the active areas of the thin active portion of the diaphragm 14 are piezoresistors 19 (FIG. 2). Piezoresistors 19 are formed or otherwise fabricated in a Wheatstone Bridge array. There is a glass supporting member 18, which is fabricated from Pyrex. The member 18 has through holes 16 which co-act with the contacts emanating from the piezoresistors or the bridge array. The contacts are directed through conical like openings, such as the through holes 16, which are filled with a metal frit 17.

By referring to the above-noted patents, the ultra thin surface mount sensor 10 is fabricated utilizing a sacrificial wafer, which is bonded and treated with a pattern wafer to form the sensor structure depicted. The views of the sensor structure shown in FIG. 1 and 2 is also shown in the 590' patent and essentially, such a pressure sensor 10 is approximately 100 mils by 100 mils and is fabricated from two or more semiconductor wafers of silicon, or any other suitable semiconductor wafer material. The transducer is fabricated using conventional wafer processing techniques, which enable a number of dielectrically isolated piezoresistive sensor elements 19 to be formed on the semiconductor material or silicon substrate 11 using a dielectric film of silicon dioxide or the like.

As indicated, each sensor element 19 is essentially a variable resistor and there is one for each leg of the Wheatstone Bridge with each of the respective resistances varying in proportion to an applied force or pressure to the transducer 10. In the configuration shown, the circuit leads of the Wheatstone Bridge consist of four oversized P+ silicon electrical contact area or fingers, which are mainly located in the non-active areas 29 of the transducer. The sensor leads are directed to the output contacts via the through holes 16. The term "fingers" is used to indicate that the areas which project from the sensors are directed to metal contacts within each finger. The metal contacts are circular in shape and each is approximately 10 mils in diameter. Each contact includes a centrally located area of high temperature platinum titanium metalization. This is all shown and explained in the '590 patent which is incorporated in its entirety herein.

Once the silicon transducer is fabricated, it is now bonded to a glass support member 18 (FIG. 2) which preferably is fabricated from Pyrex. The glass support member 18, as indicated, has through holes 16 which basically are four in number and which are connected to the metalized portion of the contact associated with the sensor bridge structure formulated on the silicon chip 11. The glass-supporting member 18 is electrostatically bonded to the silicon wafer 11. The glass member includes a series of depressions located on the bottom surface or side that is sealed to the P+ fingers and has a rim such that the sensor network will not seal to the glass and has a sufficient depth to provide a cavity 15 to allow the thin portions or active regions 14 of the diaphragm to deflect. No sealants of any type are needed between the glass member 18 and the silicon transducer chip 10 because the over-sized contacts and the raised rim are provided on the transducer. This is all described in the above-noted '590 patent. In any event, as one can see from FIGS. 1 and 2, there is a transducer element which is an ultra thin sensor capable of high temperature operation.

Figures 3A, 3B:
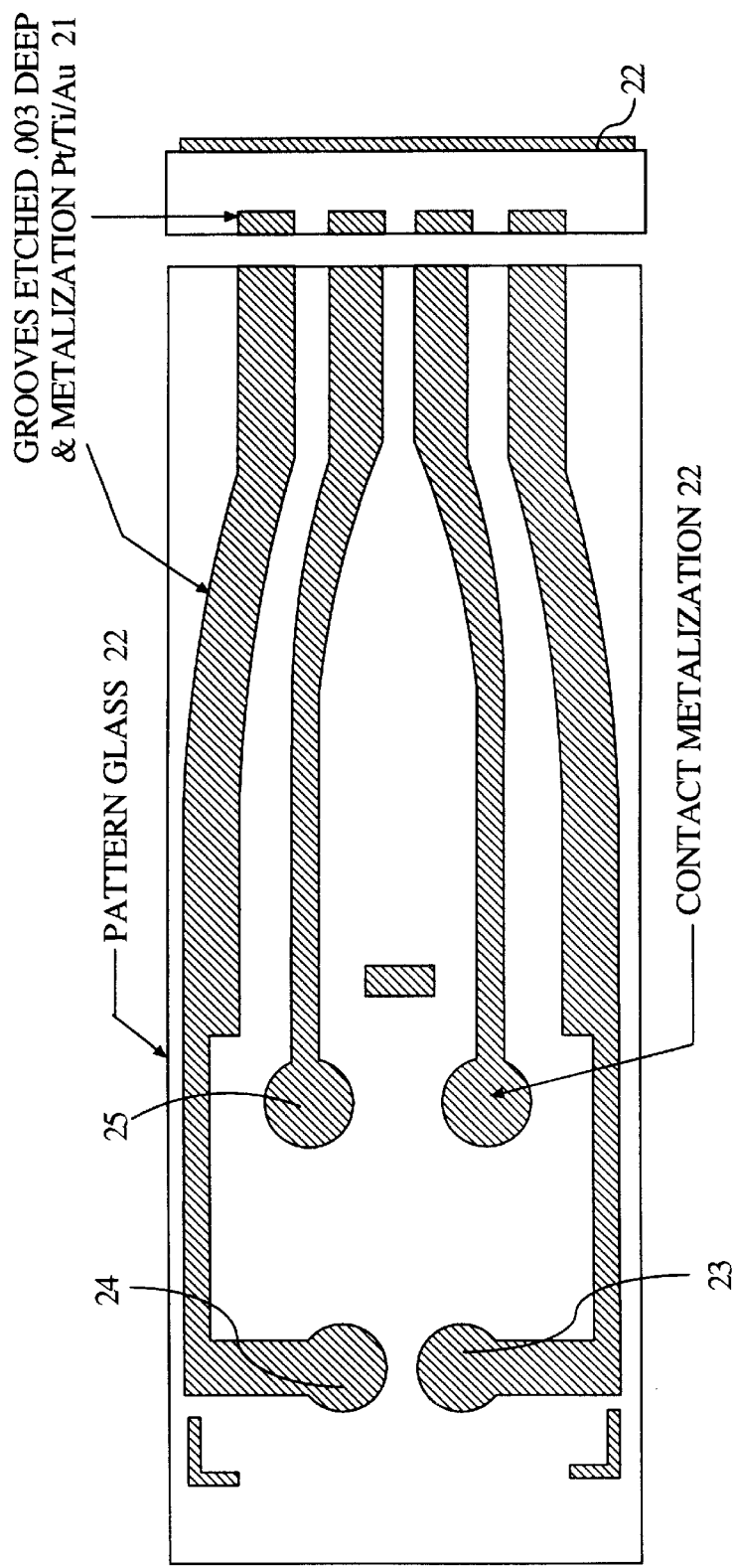
FIGS. 3A and 3B are respectively a top plan view and a front view of a glass support substrate for accommodating the sensor configurations shown in FIGS. 1 and 2 and FIGS. 1B and 2B.

Referring to FIGS. 3A and 3B, there is shown a top plan view and a side view of a borosilicate glass structure, which is designated as a high temperature pattern glass 20. The borosilicate structure has four circular depressions as 22, 23, 24 and 25. These depressions correspond to the contact areas of the semiconductor sensor with additionally depressed lead out channels 21. The lead out channels 21 and the contact depressions are metalized as shown in FIG. 3A by the crosshatched areas. Thus, each depressed region, such as 24 and 25, is directed via a channel 21 for directing to contact region 24. The channel is directed towards the edge of the chip and is then metalized in a usual manner. Metalization is implemented by using sputtering, evaporation and so on employing a high temperature metalization system, such as layers of titanium, platinum and gold applied in succession to the various depressions. Hence, the structure shown in FIG. 3A and FIG. 3B is a borosilicate planar member having etched circular depressions 24 which are directed to the metalization channels 21. As shown in FIG. 3B, there may be an underlying large metalized area 22 which is a platinum titanium gold metalization area.

Figure 5:
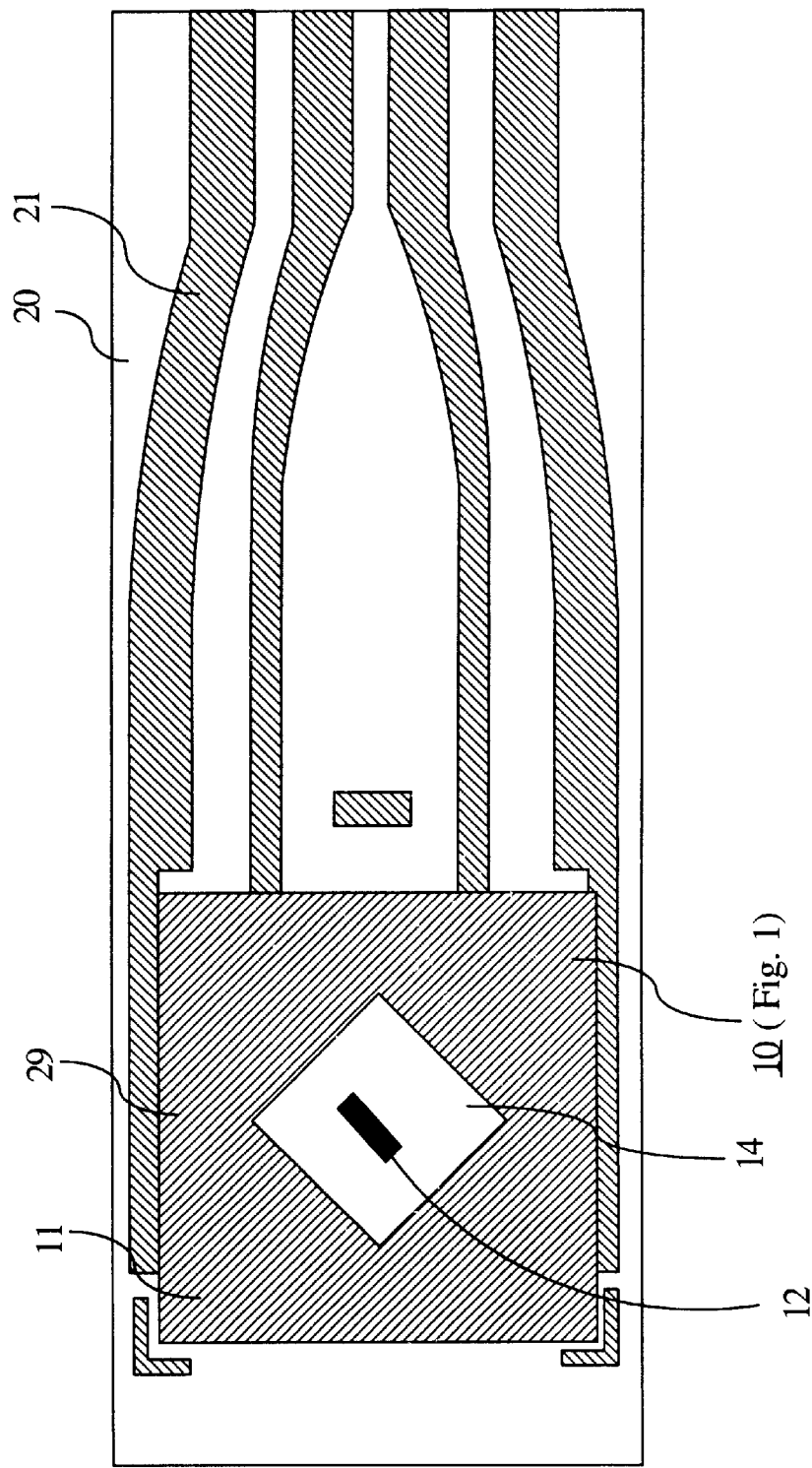
FIG. 5 is a top plan view showing the sensor of FIG. 1 mounted and positioned on the glass support structure of FIGS. 3A and 3B.
Figure 5B:
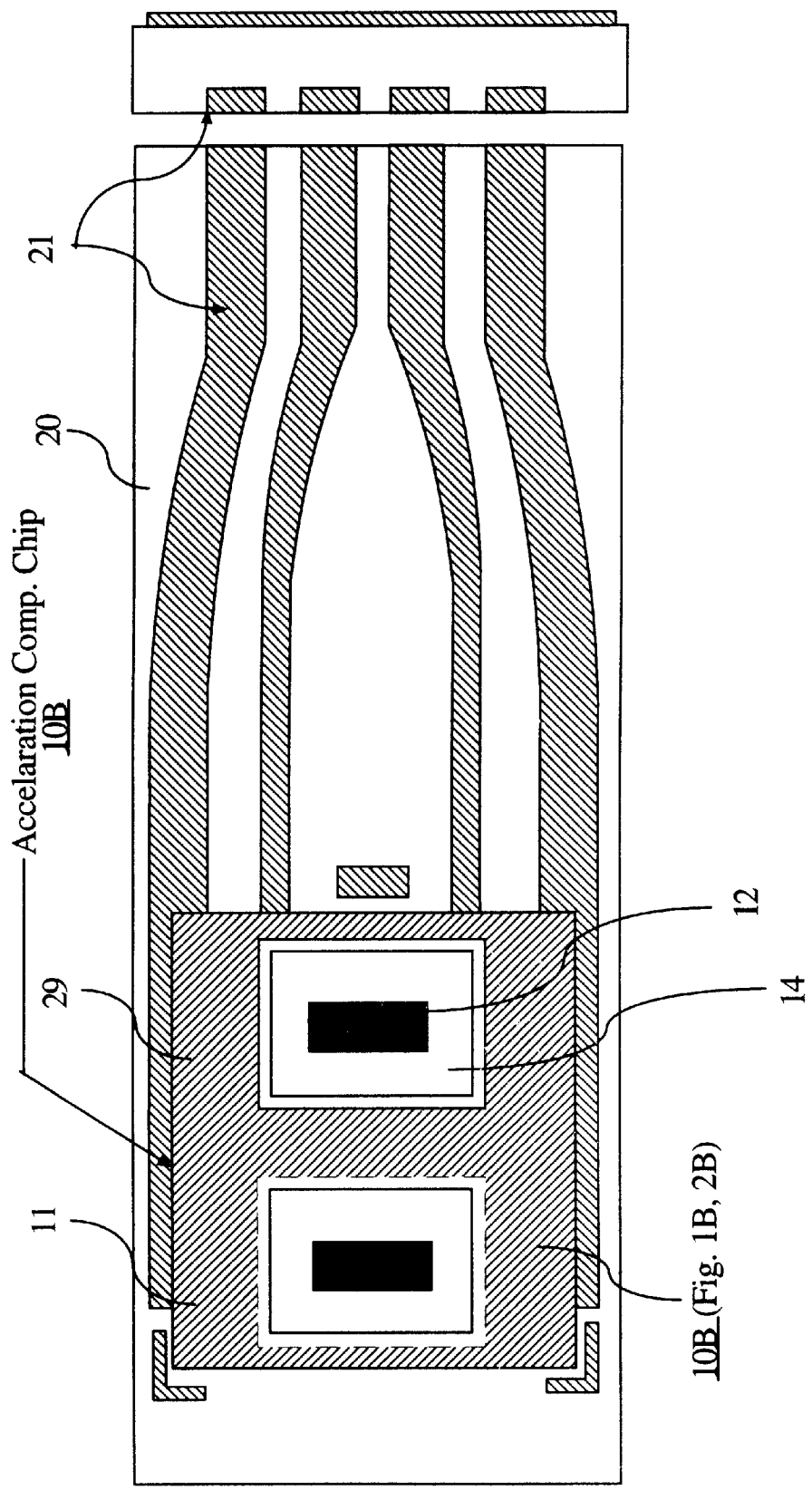
FIG. 5B is a top view showing the sensor of FIG. 1B mounted and positioned on the glass support structure of FIGS. 3A and 3B.
Figure 6:
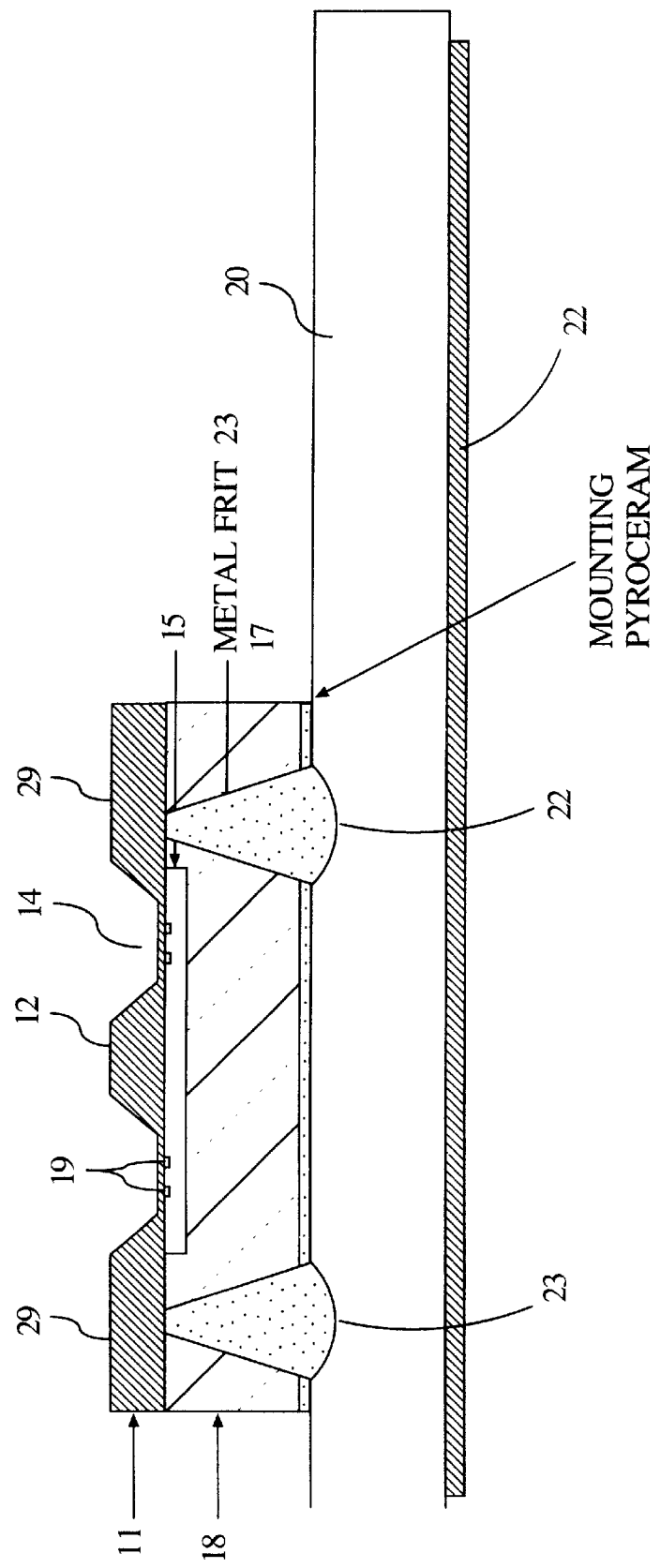
FIG. 6 is a side view showing the sensor mounted on the glass substrate.
Figure 6B:
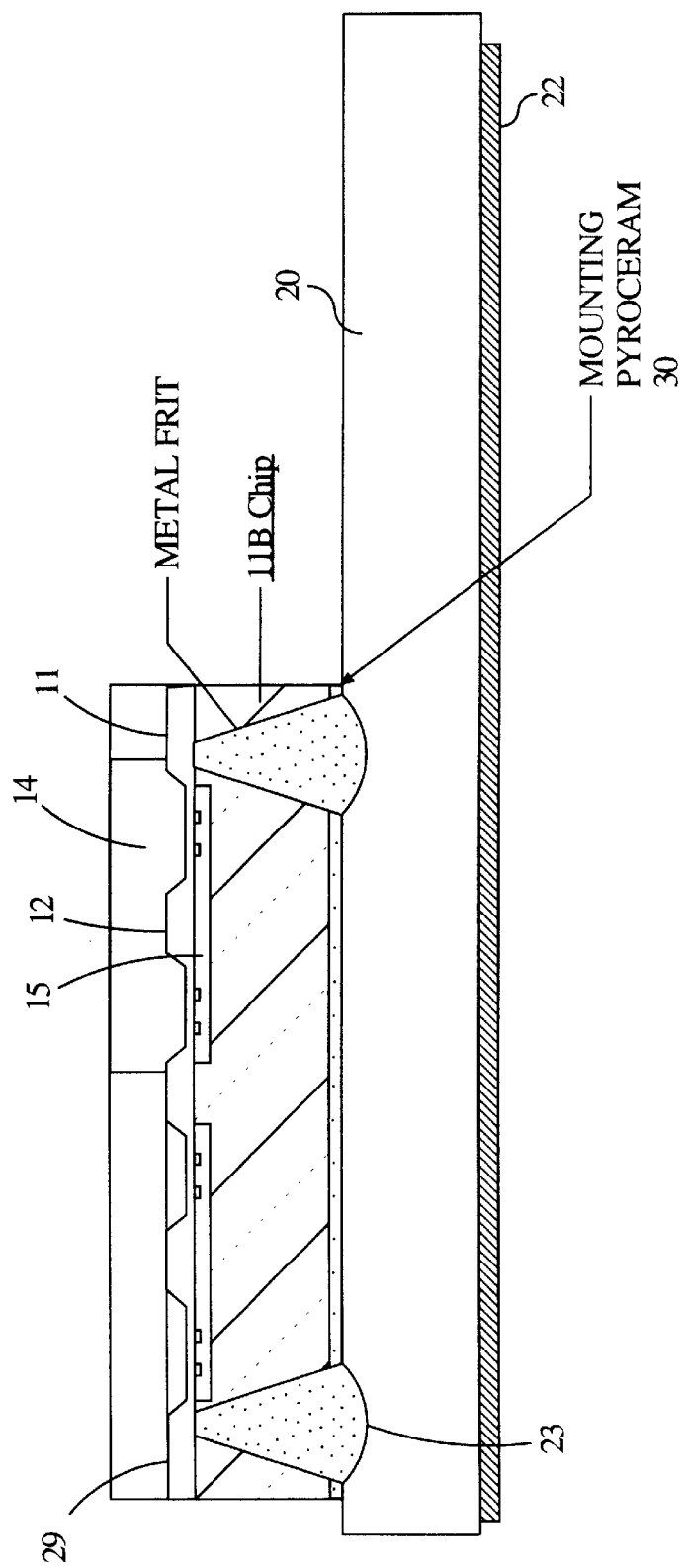
FIG. 6B is a side view showing the acceleration composite sensor mounted on the glass substrate.
Figure 7:
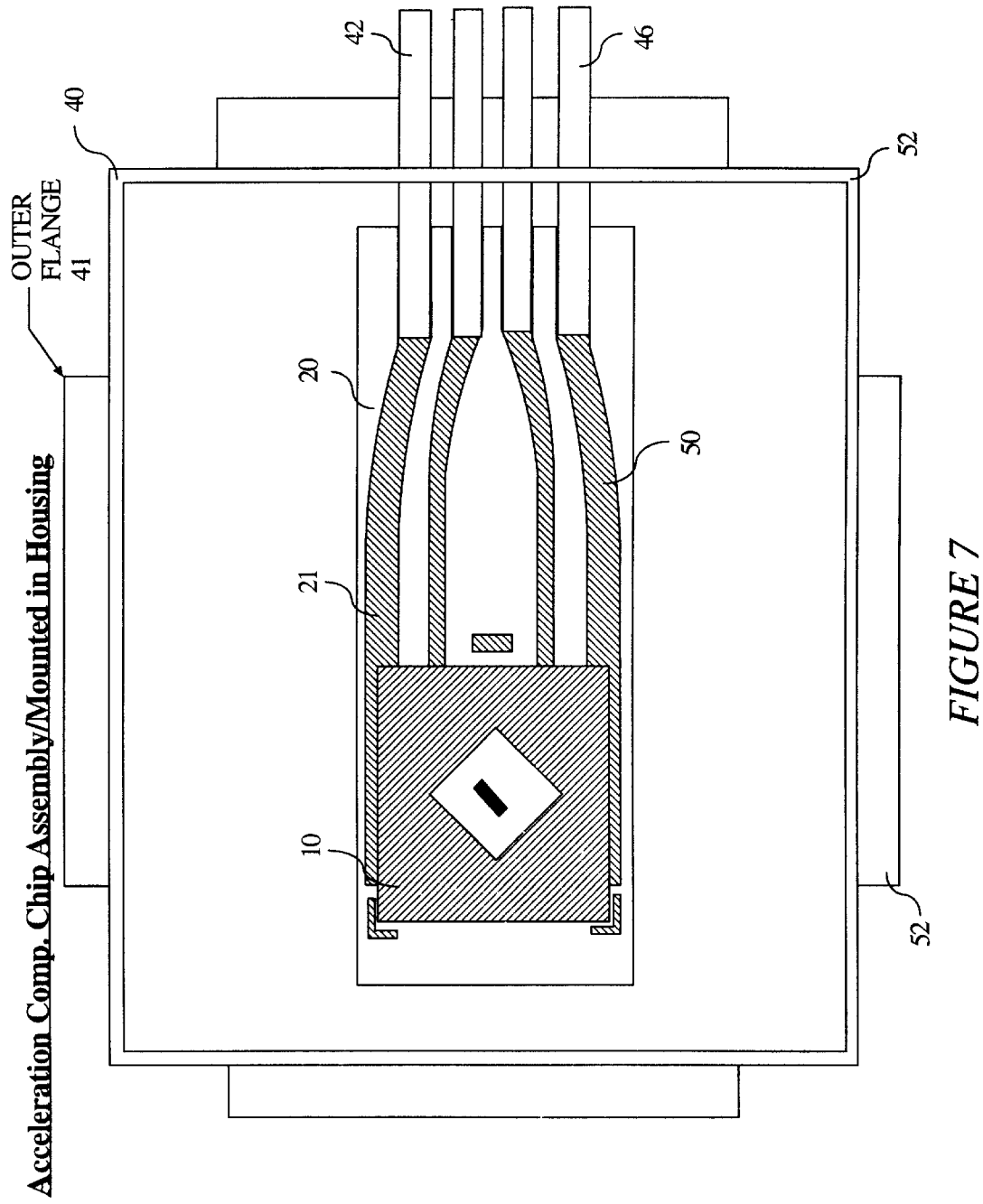
FIG. 7 is a top plan view showing the composite sensor and glass substrate mounted in a flat-pack header.
Figure 7B:
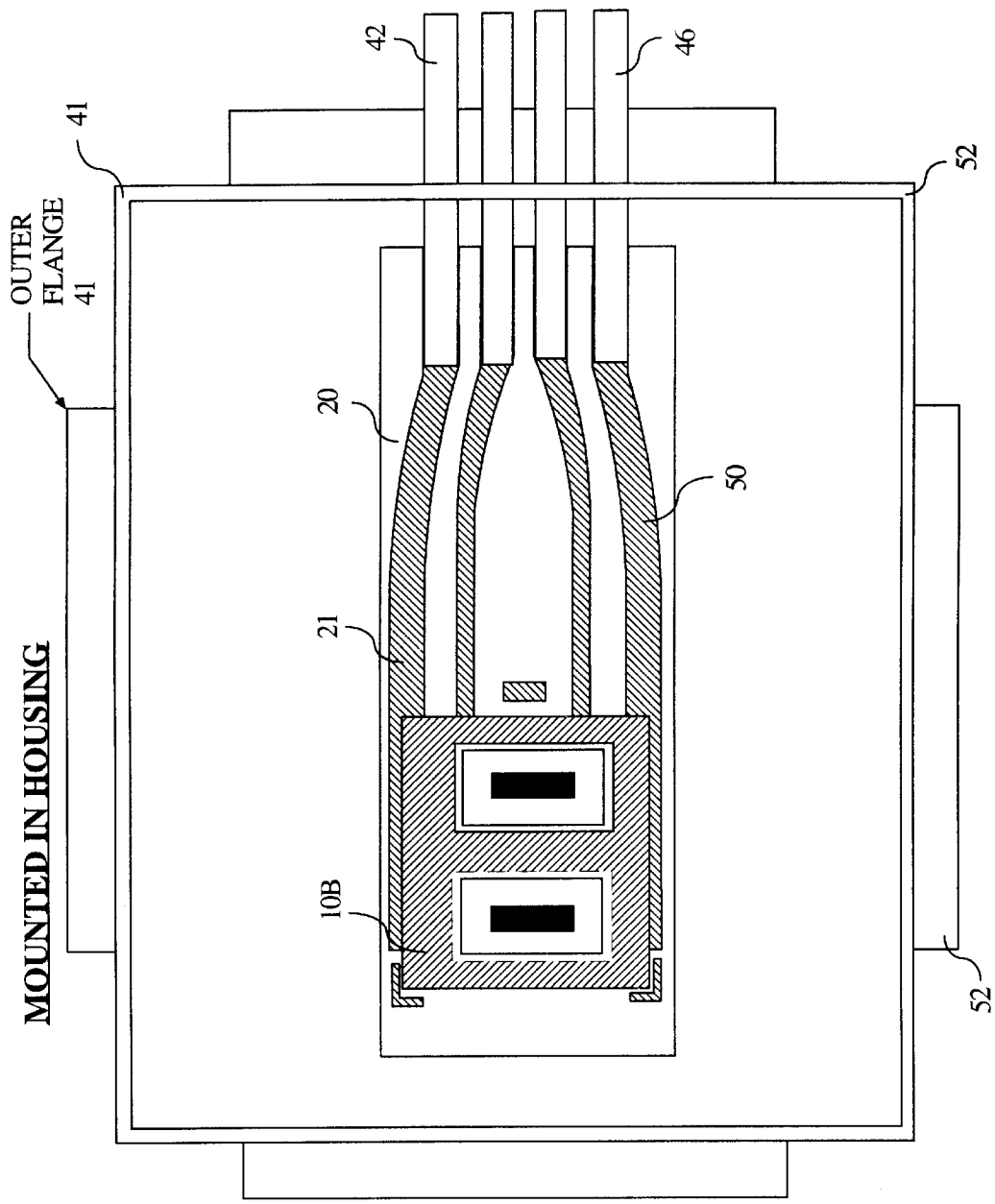
FIG. 7B is a top plan view showing the composite acceleration composite sensor and glass substrate mounted in a flat-pack header.

Referring to FIG. 5, there is shown the wafer of FIGS. 1 and 2 mounted on the borosilicate glass structure 20. FIG. 6 shows a side view where the metal frit areas 17 of the wafer of FIG. 2 are positioned in the metalized aperture, as, for example, 22 and 23 of the pattern glass structure 20 structure. Essentially, in the manufacture of the device, sensor structure 10 of FIG. 1 and FIG. 2 is first mounted to the glass structure 20 using a metal glass frit in the contact depressions, such as, depressions 22 to 25 and Pyroceramglass 30 in the non-protruding area of the sensor structure. As seen in FIG. 6, the metal frit contacts 17 of the chip 18 are placed in direct contact with the metalized circular depressions 22 and 23, which also has the depressions 24 and 25 for the other terminals of the chip. These are positioned one above the other and as shown in FIG. 6, actually reside therein. The chip is bonded to the glass plate by means of the Pyroceram-glass layer 30. At the same time, the metal frit which basically consists of a mixture of gold and glass frit is heated to permanently secure the contacts of sensor to the lead-outs of the pattern glass. Pyroceram is a glass material manufactured by the Corning Glass Company. These glasses are thermosetting and devitrify at temperatures on the order of 450° C. Upon devitrification, the glass develops a crystalline structure which results in a strong seal, as the crystallized material softening point is higher than conventional glass. Pyroceram also exhibits excellent mechanical properties at temperatures well in excess of 400° C. The Pyroceram glass metal frit is prepared by mixing finely powdered Pyroceram glass and gold or Pt-Palladium with a suitable suspension vehicle, such as a mixture of nitrocellane and anylacerate to a desired consistency to form a paste-like mixture of metal glass frit. The paste-like mixture is then injected using any suitable method into the apertures as well as the circular depressions.

Figure 8:
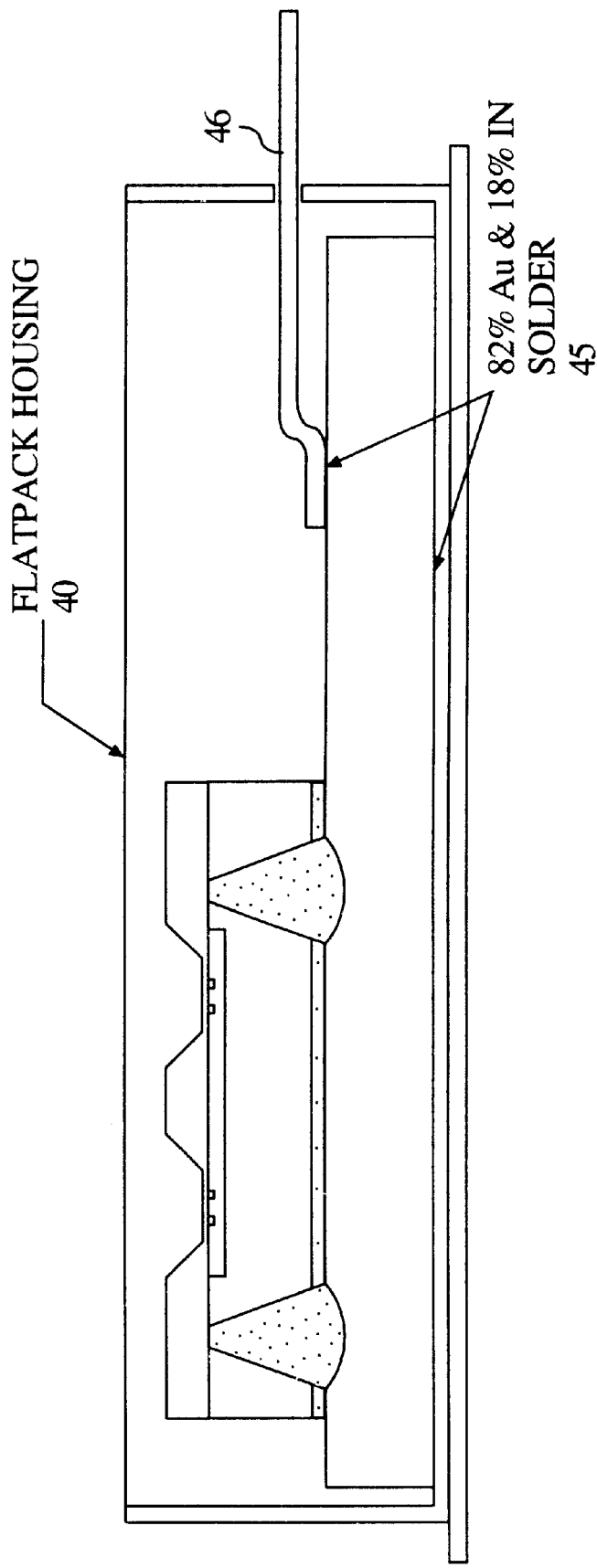
FIG. 8 is a side view partially in cross sectional view of the structure depicted in FIG. 7.
Figure 8B:
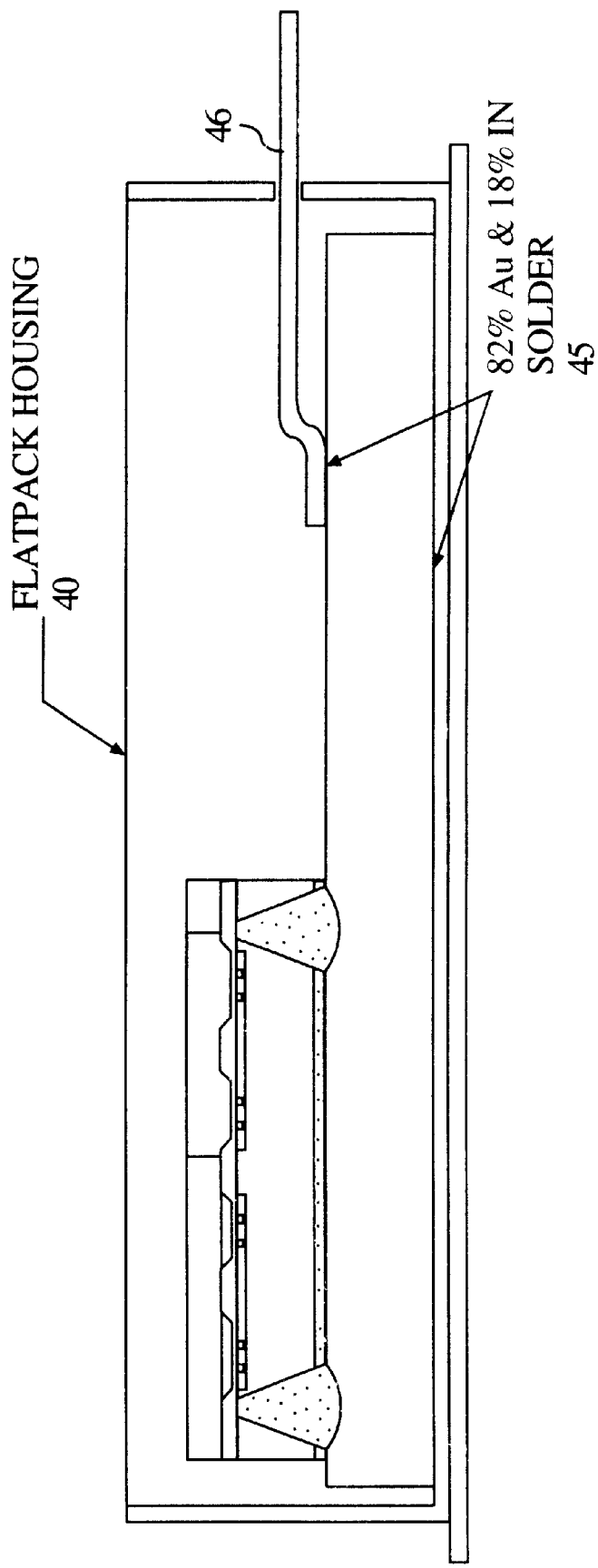
FIG. 8B is a side view partially in cross sectional view of the structure depicted in FIG. 7B.

Referring to FIG. 8, there is shown the sensor 10, which was secured to the borosilicate metalized planar member 20 is now secured to a flat-pack housing 40 using the gold-indium solder or Pyroceram. Flat-pack housing 40 is well known and is available from many sources. Basically, the flat-pack header is fabricated from a flat piece of metal, namely Kovar. The flat-pack header has glass sealed output pins as 42 and 46, which essentially are shown in FIG. 8. Pin 46 is shown in contact with the bottom metalized channel lead 50 associated with one of the contacts of the sensor 10. The pin 46 is soldered to the metalized area 50 by means of a solder which consists of 82% gold and 18% indium or other very high melting solder. The composite sensor metalized glass structure is affixed to the metal flat-pack structure 40 using a high temperature solder such as indium gold or a low-melting Pyroceram. If the composite sensor glass structure is to soldered to the metal structure, the opposite side of the glass structure, the side without depressions is metalized as is shown, for example, in FIG. 4 by the layer of metalization 22. This layer of metalization is then soldered to the Kovar structure. The glass structure can also be glass mounted to the Kovar structure thus eliminating the need for metalization on the back of the glass structure. The leads are attached, as indicated, by soldering to the depressed end channel regions using the same type of solder as described above. It is also seen, the flat-pack is shown with an extending peripheral flange 52 whereby basically the flange 52 is now covered by the flat pack. The extended flange may be the bottom surface of the flat pack and the flange may be attached to any structure by spot welding the outer flange areas as 41 and 42. The sensor structure may also be mounted on a structure to be monitored using high temperature solder or a high temperature cement such as a high temperature epoxy.

Figure 1B:
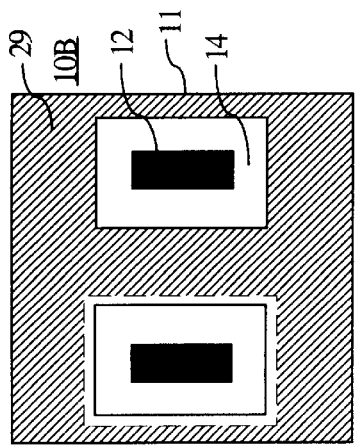
FIG. 1B is a top view of an acceleration compensated sensor used in this invention.
Figure 2B:
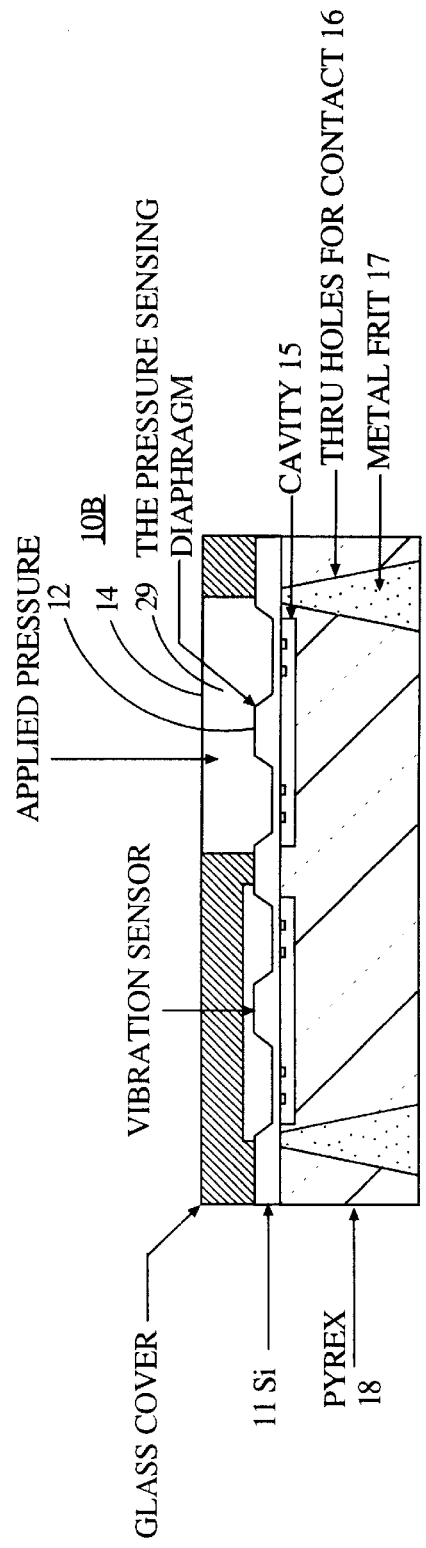
FIG. 2B is a cross sectional view of the acceleration compensated sensor of FIG. 2.

While there is shown a typical single sensing device, it is also understood that the same technique can be utilized with sensors of various other configurations produced and manufactured in the same way as the sensor shown in FIG. 1 and FIG. 2. For example, reference is made to U.S. Pat. No. 6,293,154 entitled, "Vibration Compensated Pressure Sensing Assembly" by A. D. Kurtz issued on Sep. 25, 2001 and is assigned to the assignee herein. In that patent there is disclosed a pressure sensing device for producing an output proportional to applied pressure irrespective of vibration and acceleration of the device. Essentially, the device is fabricated with similar sensor configurations to the sensor structure described herein. Therefore, such an acceleration compensated sensor (FIGS. 1B and 2B) can also be mounted in the same exact way as the sensor 10 described above (FIGS. 5B, 6B, 7B and 8B). Thus, there is described a novel high temperature high acceleration compensated surface mounted pressure transducer.

Basically, the structure consists of three basic parts. There is an ultra thin surface mount sensor which is secured to a borosilicate glass structure having four or more circular depressions corresponding to the contact areas of the semiconductor sensor with additional depressed lead-out channels. The lead-out channels extend from the contact depressions and are metalized with a high temperature metalization. The composite structure consisting of the borosilicate glass support structure and the thin surface mount sensor are secured to a flat-pack header or flat piece of metal such as Kovar, thus forming a high temperature transducer. It should be apparent to one suited in the art that other configurations and alternate structures are anticipated as being with the spirit and scope of the claims appended herein.

I claim:

1. A high temperature transducer structure, comprising:
   an insulator planar member having disposed on a top surface a plurality of depressions for accommodating contact areas, each depression having an associated metalized channel directed from said depression to a contact end of said planar member,
   a silicon sensor member having a deflectable diaphragm area associated with piezoresistive sensors, said active area surrounded by a non-active area, said non-active area having a plurality of contacts coupled to said piezoresistive sensors and directed through contact apertures to a contact surface of said silicon member, said plurality of contacts arranged in congruency with said plurality of depressions so that each contact of said sensor member is positioned in an associated depression when said sensor member is positioned on said planar member,
   means for securing said sensor member to said planar member to form a composite member,
   a metallic flat housing having external leads at a terminating end, said housing when accommodating said composite member having an associated external lead corresponding with an associated metalized channel for connecting said lead to said channel when said composite member is located in said housing.

2. The high temperature transducer according to claim 1 wherein said planar insulator member is a glass planar member.

3. The high temperature transducer according to claim 2 wherein said glass is borosilicate glass.

4. The high temperature transducer according to claim 1 wherein each depression is metalized.

5. The high temperature transducer according to claim 1 wherein said silicon sensor member includes a silicon wafer having a central boss surrounded by an active frame area which in turn is surrounded by a non-active outer area on a top surface,
   a plurality of piezoresistive sensing elements located on a bottom surface of said wafer below said active area and having contacts on said bottom surface directed from said associated sensor to the non-active area, said silicon waver coupled to a glass supporting wafer having an associated through hole positioned at each contact of said sensor, with each through hole filled with a conductive material to provide a connection from an associated sensor to a connecting surface of said glass wafer, each through hole contact positioned at a depression on said planar member.

6. The high temperature transducer according to claim 5 wherein said glass wafer is secured to said insulator planar member by means of a glass bond.

7. The high temperature transducer according to claim 6 wherein said glass bond is a Pyroceram glass.

8. The high temperature transducer according to claim 1 wherein said bottom surface of said insulator planar member is metalized.

9. The high temperature transducer according to claim 1 wherein said channels are metalized with a Pt/Ti/Au metalization.

10. The high temperature transducer according to claim 5 wherein said silicon wafer is electrostatically bonded to said glass wafer.

11. The high temperature transducer according to claim 8 wherein said metallic housing is fabricated from Kovar.

12. The high temperature transducer according to claim 1 wherein said piezoresistive sensors are P+ sensor elements fusion bonded to said silicon sensor member.

13. The high temperature transducer according to claim 11 wherein said metalized bottom surface of said insulator planar member is soldered to said Kovar housing.

14. The high temperature transducer according to claim 5 wherein said glass supporting member has a central recess to enable said silicon sensor member to defect when coupled to said glass sensor member.

15. The high temperature transducer according to claim 1 wherein each metalized channel is soldered to an associated external lead.

16. The high temperature transducer according to claim 15 wherein said solder is a gold, indium solder.

17. The high temperature transducer according to claim 1 wherein said composite member is bonded to said metallic housing by a low melting glass.

18. The high temperature transducer according to claim 17 wherein said glass is Pyroceram.

19. The high temperature transducer according to claim 1 wherein said metallic housing is a flat-pack housing having peripheral flanges to enable said transducer to be secured to a structure being mounted.

20. The high temperature transducer according to claim 19 wherein said flanges are spot welded to said structure.

* * * * *